(12) United States Patent
Desai et al.

(10) Patent No.: US 9,819,655 B1
(45) Date of Patent: *Nov. 14, 2017

(54) METHOD AND SYSTEM FOR SENSITIVE DATA ABSTRACTION

(71) Applicant: JPMorgan Chase Bank, N.A., New York, NY (US)

(72) Inventors: Prashant Desai, Land O Lake, FL (US); Bryant R. Barrera, Wesley Chapel, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,329

(22) Filed: Mar. 20, 2017

Related U.S. Application Data

(63) Continuation of application No. 14/681,421, filed on Apr. 8, 2015, now Pat. No. 9,628,488.

(51) Int. Cl.
  *G06F 7/04* (2006.01)
  *H04L 29/06* (2006.01)
  *H04M 3/51* (2006.01)

(52) U.S. Cl.
  CPC ........ *H04L 63/0428* (2013.01); *H04L 63/062* (2013.01); *H04L 63/108* (2013.01); *H04M 3/51* (2013.01)

(58) Field of Classification Search
  CPC .. H04L 63/0428; H04L 63/062; H04L 63/108
  USPC ...................................................... 726/2–4
  See application file for complete search history.

(56) References Cited

U.S. PATENT DOCUMENTS

| | | | |
|---|---|---|---|
| 5,638,457 A | 6/1997 | Deaton et al. |
| 5,675,662 A | 10/1997 | Deaton et al. |
| 5,734,838 A | 3/1998 | Robinson et al. |
| 5,784,562 A | 7/1998 | Diener |
| 5,790,785 A | 8/1998 | Klug et al. |
| 5,794,259 A | 8/1998 | Kikinis |
| 5,796,395 A | 8/1998 | De Hond |
| 5,815,657 A | 9/1998 | Williams et al. |
| 5,845,260 A | 12/1998 | Nakano et al. |
| 5,892,900 A | 4/1999 | Ginter et al. |
| 5,898,780 A | 4/1999 | Liu et al. |
| 5,914,472 A | 6/1999 | Foladare et al. |
| 5,915,244 A | 6/1999 | Jack et al. |

(Continued)

*Primary Examiner* — Anthony Brown
(74) *Attorney, Agent, or Firm* — Hunton & Williams LLP

(57) ABSTRACT

According to an embodiment of the present invention, a system and method for transmitting sensitive data in a contact center environment comprising a transient datastore containing data, for each customer, defining a customer's profile including historical interactions with a host entity and account information, the customer profile containing sensitive and non-sensitive data; a computer processor, coupled to the computer store and programmed to: generate, using a computer processor, a transient key associated with a subset of data for the customer based on the current interaction data and a customer identity; transmit, using a computer processor, the transient key and non-sensitive data to the live agent; receive a request, the transient key and a requester identifier from a requesting component of the system, and identify a corresponding subset of data responsive to the transient key and the requester identifier.

20 Claims, 3 Drawing Sheets

Contact Center Deployment Implementation Architecture

(56) References Cited

U.S. PATENT DOCUMENTS

| | | |
|---|---|---|
| 5,918,239 A | 6/1999 | Allen et al. |
| 5,933,817 A | 8/1999 | Hucal |
| 5,953,710 A | 9/1999 | Fleming |
| 5,958,007 A | 9/1999 | Lee et al. |
| 5,960,411 A | 9/1999 | Hartman |
| 5,963,952 A | 10/1999 | Smith |
| 5,969,318 A | 10/1999 | Mackenthun |
| 5,991,751 A | 11/1999 | Rivette et al. |
| 6,005,939 A | 12/1999 | Fortenberry |
| 6,012,088 A | 1/2000 | Li et al. |
| 6,014,636 A | 1/2000 | Reeder |
| 6,014,638 A | 1/2000 | Burge et al. |
| 6,026,429 A | 2/2000 | Jones et al. |
| 6,032,147 A | 2/2000 | Williams et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,105,012 A | 8/2000 | Chang et al. |
| 6,298,330 B1 | 10/2001 | Gardenswartz et al. |
| 6,389,537 B1 | 5/2002 | Davis et al. |
| 6,499,105 B1 | 12/2002 | Yoshiura et al. |
| 6,820,202 B1 | 11/2004 | Wheeler et al. |
| 7,587,763 B2 | 9/2009 | Yodaiken |
| 7,747,866 B1 | 6/2010 | Everhart |
| 8,032,936 B2 | 10/2011 | Yodaiken |
| 8,386,381 B1 | 2/2013 | Barton et al. |
| 8,824,664 B1* | 9/2014 | Ristock ............... H04M 3/523 379/266.01 |
| 8,984,276 B2 | 3/2015 | Benson |
| 2002/0118095 A1* | 8/2002 | Estes ..................... G07F 17/12 340/5.6 |
| 2004/0123137 A1 | 6/2004 | Yodaiken |
| 2004/0255223 A1 | 12/2004 | Chawla |
| 2008/0052328 A1 | 2/2008 | Widhelm et al. |
| 2009/0261162 A1 | 10/2009 | Kargman et al. |
| 2010/0011444 A1 | 1/2010 | Yodaiken |
| 2010/0281223 A1 | 11/2010 | Wolfe et al. |
| 2014/0270108 A1 | 9/2014 | Riahi et al. |

\* cited by examiner

_US 9,819,655 B1_

METHOD AND SYSTEM FOR SENSITIVE DATA ABSTRACTION

RELATED APPLICATIONS

The subject application is a Continuation Application of U.S. application Ser. No. 14/681,421, filed Apr. 8, 2015, which is hereby incorporated by reference herein in its entirety. This application is related to co-pending application, U.S. application Ser. No. 14/681,372, titled "Method and System for Conveying Context Data in a Multi-Channel and Omni-Channel Environment"), filed Apr. 8, 2015, the contents of which are incorporated herein in its entirety.

FIELD OF THE INVENTION

The present invention relates generally to contact center management and more specifically to sensitive data abstraction using a key or token to pass customer data through systems across an organization.

BACKGROUND OF THE INVENTION

Customer data from a host system of an organization may be used by multiple systems across the organization to service the customer when the customer contacts the organization or when the organization proactively reaches out to the customer. During these interactions, the customer data may pass through multiple network devices, servers, applications and user interfaces, for example. Each of these devices may use a portion of the data to make certain decisions, which may include decisions to route the customer to the right place. Customer data can traverse these devices either encrypted or unencrypted. Because the data is passed through these devices, these devices invariably store the customer data in memory (e.g., transient memory), in disk (e.g., logs) and a database for reporting and analytics. The developer/architect decides what data is used by each of these devices and stored for later use. Inevitably, the data that is passed and also saved will contain sensitive data.

Current systems require significant cost and resources to secure the data end-to-end across multiple devices (in-transit and at rest) and to further manage policies for storing and maintaining customer data.

Other drawbacks may also be present.

SUMMARY OF THE INVENTION

Accordingly, one aspect of the invention is to address one or more of the drawbacks set forth above. According to an embodiment of the present invention, an automated computer implemented system for transmitting sensitive data in a contact center environment comprises: a transient datastore containing data, for each customer, defining a customer's profile including historical interactions with a host entity and account information, the customer profile containing sensitive and non-sensitive data; a computer processor, coupled to the computer store and programmed to: receive, via an electronic input, a contact from a customer via an electronic communication channel; automatically capture current interaction data between the customer and an automated interactive entity; receive an electronic request for a live agent from the customer; generate, using a computer processor, a transient key associated with a subset of data for the customer based on the current interaction data and a customer identity; transmit, using a computer processor, the transient key and non-sensitive data to the live agent; receive a request, the transient key and a requester identifier from a requesting component of the system, identify a corresponding subset of data responsive to the transient key and the requester identifier; determine an appropriate security feature for the subset of data; transmit the subset of data with the appropriate security feature to the requesting component; and automatically remove the transient key from the transient datastore after a predetermined event.

According to another embodiment of the present invention, an automated computer implemented method for transmitting sensitive data in a contact center environment comprises the steps of: receiving, via an electronic input, a contact from a customer via an electronic communication channel; automatically capturing current interaction data between the customer and an automated interactive entity; receiving an electronic request for a live agent from the customer; generating, using a computer processor, a transient key associated with a subset of data for the customer based on the current interaction data and a customer identity; transmitting, using a computer processor, the transient key and non-sensitive data to the live agent; receiving a request, the transient key and a requester identifier from a requesting component of the system, identifying a corresponding subset of data responsive to the transient key and the requester identifier; determining an appropriate security feature for the subset of data; transmitting the subset of data with the appropriate security feature to the requesting component; and automatically removing the transient key from a transient datastore after a predetermined event; the transient datastore containing data, for each customer, defining a customer's profile including historical interactions with a host entity and account information, the customer profile containing sensitive and non-sensitive data.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
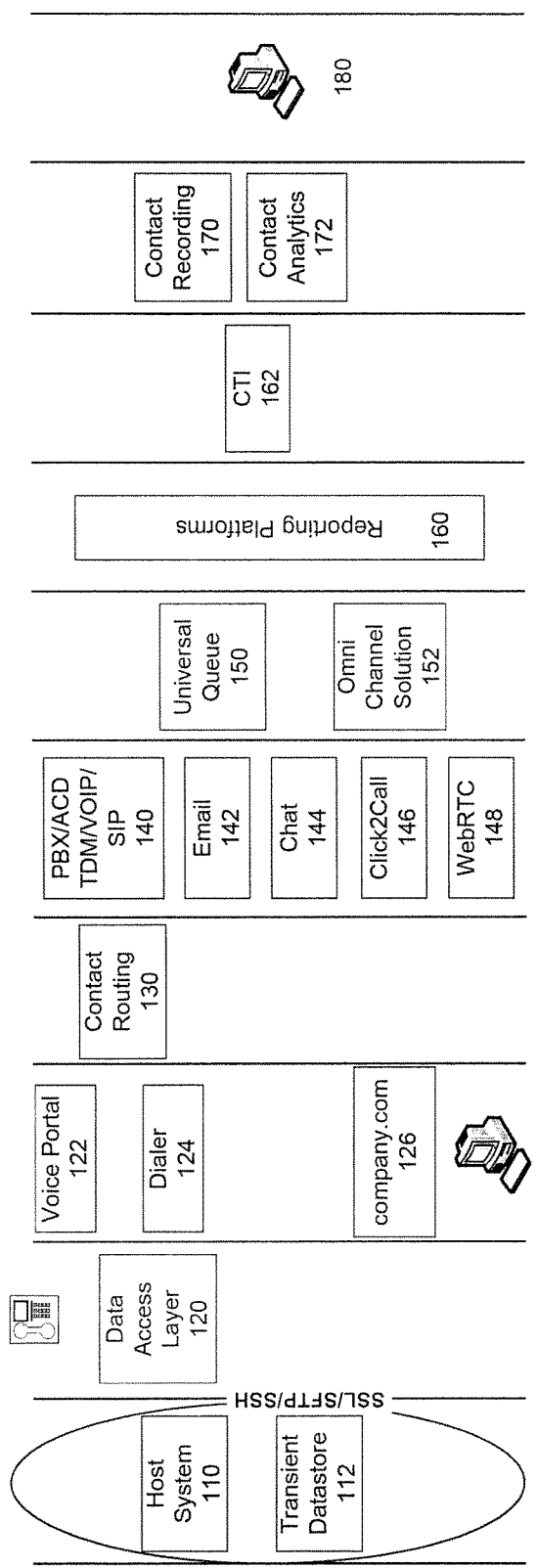
FIG. 1 is an exemplary contact center deployment implementation architecture, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a transient datastore for generating a key for transmitting sensitive data in a contact center environment. According to an embodiment of the present invention, the transient datastore generates a key and provides only the relevant data. In some applications, the relevant data may be pre-determined, pre-processed and/or filtered based on the request and/or requesting component identity. For example, the data may be provided to clients on a whitelist. The whitelist may represent a predefined list of clients or users allowed to access specific data elements to perform functions. The whitelist may be derived based on network elements and specific key structure in the request for data. In addition, the data may be transient and available for a pre-configured amount of time or based on a threshold (e.g., end of the day, after an event, until the next interaction, etc.) for each interaction. The availability of data may be based on factors or conditions, as well as a predetermined white list of clients. Data access requests may come to the transient datastore which then goes to a system of record. According to an embodiment of the present invention, devices, applications, servers, and other components may pass the generated key along with non-sensitive data. Accordingly, sensitive data is not passed between devices, components and/or systems within an organization. Each device, application, server and other component then if required or needed may query the transient datastore for additional information. For specific circumstances where sensitive data is required, the data may be used in memory and then cleared after usage. Notably, this data is not written to a disk (e.g., logs, databases, etc.) nor is the data passed to another application, server, device or other component. In addition, an end user (e.g., contact center agent, specialist, supervisor, etc.) may be required to demonstrate additional authentication to view the full customer profile if needed. For example, this may be restricted to a specific group of users only.

In conventional systems, all the data—whether needed or not—is passed to every component in the data or processing chain until the data finally reaches the end user, e.g., live agent, representative, other recipient or receiving unit. The components in the data or processing chain do not need all the data and oftentimes, only use a portion or subset of the data. In many instances, sensitive data is not even needed. Regardless of whether the data is used or not, each component, however, still logs in the data that is passed. This creates a security issue when customer sensitive data is passed and further logged (or saved) on each component or system in the chain. Accordingly, this leads to unnecessary security measures and wasted efforts in saving, logging and further protecting data that is not even needed. Because sensitive data is transmitted and saved, an encryption algorithm or other security feature may be applied to the data in transit and at rest. Such systems end up maintaining and protecting data in multiple systems that do not even need the protected data.

An embodiment of the present invention is directed to minimizing or eliminating the requirement to encrypt all data in transit as well as data at rest across multiple devices or even systems. Further, an embodiment of the present invention is directed to significantly reducing or eliminating the complexity involved in implementing security practices based on data classification for each device, component and/or system. In addition, an embodiment of the present invention is directed to improving overall organizational security by focusing on the data as needed. An embodiment of the present invention provides a single access layer to the data with appropriate security practices using a transient datastore that generates a key.

According to an embodiment of the present invention, the system and method provide significant reduction or elimination of distribution of sensitive data over multiple platforms and thereby address cyber security concerns. Accordingly, a reduction in cost and improved standardization for data handling may be realized.

An embodiment of the present invention is directed to providing relevant data as needed by each component for each interaction for authenticated users. Implementation of the various embodiments of the present invention across contact center platforms will improve security considerably and further manage cyber security threats quickly and easily. An embodiment of the present invention provides cost and maintenance reduction of managing encryption keys at rest and in transit. In addition, an embodiment of the present invention may eliminate or reduce the requirement for encryption and/or other forms of security measures.

Non sensitive data may include any data relating or relevant to a customer that may be helpful to a live agent and/or other representative in interacting with the customer, where the data is not deemed sensitive or confidential and therefore does not need to be secured. A contact center may refer to a centralized entity that receives requests and/or other communications from customers, users, etc. Contact centers may include call centers, help desk, a centralized customer service unit, etc. A contact center may receive requests via phone and/or other modes of communication. The contact center may manage centralized handling of individual communications, including email, faxes, social media, instant message, texts, letters, and/or other forms of communication. The contact center may include an automated service that provides a first level of customer support. The automated service may include IVR, VRU, Voice Portal, Speech Platform, Automated Assistant (multiple references), speech recognition software and/or other forms of interaction. At some point during the interaction, a customer may opt to speak with a live agent. The contact center may then transfer the customer to an agent, customer representative or other recipient or receiving unit.

IVR may represent a telephony technology in which a user uses a touch-tone telephone or other tone device to interact with a database to acquire information from or enter data into the database. IVR technology does not require human interaction over the telephone as the user's interaction with the database is predetermined by what the IVR system will allow the user access to. For example, banks and credit card companies may use IVR systems so that their customers can receive up-to-date account information instantly and easily without having to speak directly to a person. IVR technology is also used to gather information, where the user is prompted to answer questions by pushing the numbers on a touch-tone telephone.

According to an embodiment of the present invention, the key or token may be valid for specific system, specific customer and/or specific interaction and may be valid for a particular period of time or other threshold. When the key expires, none of the intermediate components will have access to the sensitive data. Because the key is transient, none of the data is stored long term.

Depending on the particular industry, other determinations may be made and other data may be analyzed. The information may also be used for routing, agent selection, targeted marketing, and/or other interactions with the customer. An embodiment of the present invention may be applied to customers who contact call centers as well as other customer interactions.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

FIG. 1 is an exemplary contact center deployment implementation architecture, according to an embodiment of the present invention. An embodiment of the present invention captures the interaction data with an IVR or other automated system and generates a key or token that corresponds to the interaction data and that is specific to the customer. The key is then passed through the system to the agent, recipient or other end user. The end user may also represent a processor, system, or other receiving unit. Rather than passing the customer specific interaction data, which may contain sensitive data, an embodiment of the present invention passes the key to various systems, applications, devices, components, etc., within or associated with the organization. When a component needs additional information, the component may send a request with the key to the transient datastore. Upon receipt, the transient datastore may authenticate the key and then identify the requesting component. Based on the identity or type of the requesting component, an appropriate subset of data may be identified and then transmitted to the requesting component accordingly. The key will then expire after the interaction. For example, the key may be valid for a time period, such as 24 hours. If the customer calls back before the end of the 24 hour period, an embodiment of the present invention may use the same key generated in the first interaction, or a variation of the key. Other thresholds and/or time periods may apply. Also, the time periods and/or thresholds may vary on the sensitivity level of the data. If the data is more sensitive, a shorter expiration may apply (e.g., 4 hours). For data that is frequently accessed, a longer expiration may apply (e.g., a week, etc.). If this data is deemed sensitive, the data may be maintained in a secure manner until the key expires. Other variations may be realized and implemented.

Also, some data may be stored selectively in a database or other long term storage. Such data may be used for analytics, reporting, feedback, marketing, data mining, etc.

In another example, for each interaction, a new key may be generated. According to another example, a new key may reference prior keys, for example, when prior data is useful or helpful to the current interaction. Other variations may be applied.

For example, an intermediate system may send a request for additional data. Based on the request, the identity (or type) of the intermediate system and the authenticated key, an embodiment of the present invention may identify a subset of data to be transmitted. Notably, an embodiment of the present invention may recognize that a customer's social security does not need to be transmitted to this particular intermediate system. According to another example, a routing platform may send a request and the key to the transient datastore where the transient datastore identifies the requested data, e.g., resolution of the customer's prior interaction. Accordingly, any sensitive data in the form of customer account number, for example, is not required for the routing platform to perform its routing function. Also, the routing platform may need access to the customer's request captured during the IVR interaction. If this information is deemed sensitive, the data itself may be encrypted.

If not, the non-sensitive data may be passed to the routing platform and other intermediate components in the organization. According to another example, if only a portion of the data is deemed sensitive, an embodiment of the present invention may encrypt or protect just that portion and leave the remaining data.

Other variations may be realized and implemented in accordance with the embodiments of the present invention. For example, multiple keys may be implemented for each customer interaction, where each key may be associated with a subset of data. Also, multiple levels of sensitivity and/or encryption may be applied.

As shown in FIG. 1, a host system 110 may include a transient datastore 112. Host System 110 may manage and maintain customer profile and personally identifiable information (PII) information. The host system 110 may represent an organization or other entity. The organization itself may have other associations, affiliations, etc. The system architecture may include Data Access Layer 120 to provide backend access and also support multiple protocols and multiple sources of data. Data Access Layer 120 may represent a layer of a computer program that provides access to data stored in Transient Datastore 112. While a single transient datastore is illustrated, the transient datastore may be distributed across multiple systems, platforms, remote locations, etc. In addition, transient datastore may be at a centralized location or facility. Accordingly, Data Access Layer 120 may support multiple datastores and database types. Data Access Layer 120 provides a centralized location for all requests from various sources to the datastore.

A customer may interact with the host system 110 via various forms of communication supported by voice portal 122, dialer 124 and company website 126. Other forms of inbound contacts and outbound contacts may be supported. Routing functions, including multi-channel routing, may be performed and managed by contact routing 130.

The system may also support multi-channel platforms including an inbound contact handler and an outbound contact handler. The various modes of communication may be supported by PBX/ACD/TDM/VoIP/SIP 140, email 142, chat 144, click2call 146, WebRTC 148.

PBX/ACD/TDMNoIP/SIP 140 represents voice communication. Private Branch Exchange (PBX) represents a telephone exchange or switching service that serves an organization and performs concentration of central office lines and provides intercommunication between a number of telephone stations in the organization. The central office lines provide connections to the public switched telephone network (PSTN) and permits the shared use of these lines between stations in the organization. Automatic Call Distributor (ACD) represents a system that distributes incoming calls to a specific group of terminals or agents based on various factors including customer need, type and agent skill set. ACD also routes incoming calls based on a rule-based set of instructions to determine the best available agent to respond to a given incoming call. Call routing may also use customer provided information, e.g., why the customer is calling. Time-Division Multiplexing (TDM) is a method of transmitting and receiving independent signals over a common signal path by using synchronized switches at each end of the transmission line. TDM allows transmission of multiple subscriber calls over the same transmission medium to effectively and efficiently utilize the bandwidth of the medium. Voice over IP (VoIP) refers to the delivery of voice communications and multimedia sessions over Internet Protocol (IP) networks, such as the Internet. The Session Initiation Protocol (SIP) is a telecommunications protocol for signaling and controlling multimedia communication sessions. Common applications of SIP are in Internet telephony for voice and video calls, as well as instant messaging over Internet Protocol (IP) networks. The SIP protocol defines the messages that are sent between endpoints, which govern establishment, termination and other essential elements of a call. SIP can be used for creating, modifying and terminating sessions including one or several media streams.

An embodiment of the present invention also supports other forms of communication including email 142, chat 144, click2call 146 and WebRTC 148. An embodiment of the present invention may support IP communication, including telephony, video messaging, SMS, and email with comprehensive support for traditional voice communication. By providing multiple forms of communication, an embodiment of the present invention enables organizations to receive, organize and manage all forms of communication.

Chat 144 enables communication between callers via a chat feature. For example, a customer may activate a chat feature and initiate an online chat with a customer representative. The customer may be automatically connected to a particular representative. Also, the customer may select from a profile of representatives. According to another example, a group chat/conference may enable multiple customers or representatives to join a chat room. The IVR chat and conferencing feature provides real-time services and answers for customer inquiries and requests.

Click2call 146 is a web-based communication where a user can click a hyperlink (e.g., button, image, text, etc.) to request a connection with another person in real-time by phone call, VoIP or text. Click2call 146 enables a user to make phone calls using an application on a mobile phone. Click2call uses a hyperlink that sends a command to initiate two phone calls, one call to a VoIP subscriber phone and the other to an outbound number.

WebRTC, represented by 148, from the client interaction perspective will allow the user to start a chat conversation and then change seamlessly to voice and/or video conversation without dropping the session and re-establishing the session when the channel is changed. This will allow the user to have a seamless interaction with the contact center to resolve the reason for the contact.

WebRTC 148 provides a bridge between Web protocols and SIP/IMS protocols. WebRTC (Web Real-Time Communication) is an application programming interface (API) definition that supports browser-to-browser applications for voice calling, video chat, and peer to peer (P2P) file sharing without the need of either internal or external plugins. WebRTC provides browsers and mobile applications with Real-Time Communications (RTC) capabilities via simple APIs. For example, WebRTC Gateways may enable real-time communication between any browsers in the market without requiring any additional plugin installation. The Gateway may leverage WebRTC technology and provide the necessary conversion into Telecom protocols. It also enables real-time communications from the web browsers into smartphones, tablets, PC softphones, SIP phones and GSM/PSTN phones. Other forms of voice and other communication may be supported by the various embodiments of the present invention.

The system may also include queuing platforms, represented by Universal Queue 150 and. Omni Channel Solution 152. Multiple communications channels may be integrated into Universal Queue 150 to standardize processing and handling. Universal Queue 150 provides standardized routing, recording, handling, reporting and management of communications in a contact center or across an organization. Omni Channel Solution 152 may represent a device or service that converts media streams between disparate telecommunications networks. Omni Channel Solution 152 provides context sharing across a multi-channel environment allowing for optimal (e.g., best-in-class) customer experience and satisfaction improving overall NPS (Net Promoter Score). Reporting platforms, represented by 160, provides multi-channel reporting and contract center Key Performance Indicators (KPI). KPI allows for optimal management of the business and are critical to tuning systems (e.g., system interactions with customers and system to system interactions) and agents (e.g., agent interactions with customers)

Computer Telephony Integration (CTI) 162 provides interactions on a telephone and a computer to be integrated and/or coordinated. CTI 162 provides desktop-based interaction for assisting users to address customer concerns in a contact center environment. CTI 162 may provide functions including automatic call routing of calls based on a caller's number or number dialed, call reporting functions, and voice recording integration. Additional features may include call information display, automatic dialing, computer-controlled dialing, phone control and Feature control, call transfers, and call center agent state or status. Moreover, CTI 162 may provide context data to contact center agent 180. Analytics may be supported by Contact Recording 170 and Contact Analytics 172. Contact Analytics may provide real-time feedback based on analysis of historical data and current events as related to a customer contact at a particular moment in time. As shown in FIG. 1, agent 180 may represent an end user desktop and a live agent. Agent 180 may also represent a processor, system, and/or other receiving unit.

The interaction data from the IVR interaction may be cached. For example, caching may be performed if there is a large amount of context data to be passed to an agent. The function of the cache may store the information in-memory for a pre-determined period of time and create a unique key (or other identifier) that gets passed to the agent. The agent may then use the key/identifier to fetch the information from a transient database. The key in this exemplary scenario may be a location of this data, as well as a simple https web service. For example, the key may then be passed with a transfer to Contact Center Agent 180 based on routing rules or other processing.

Figure 2:
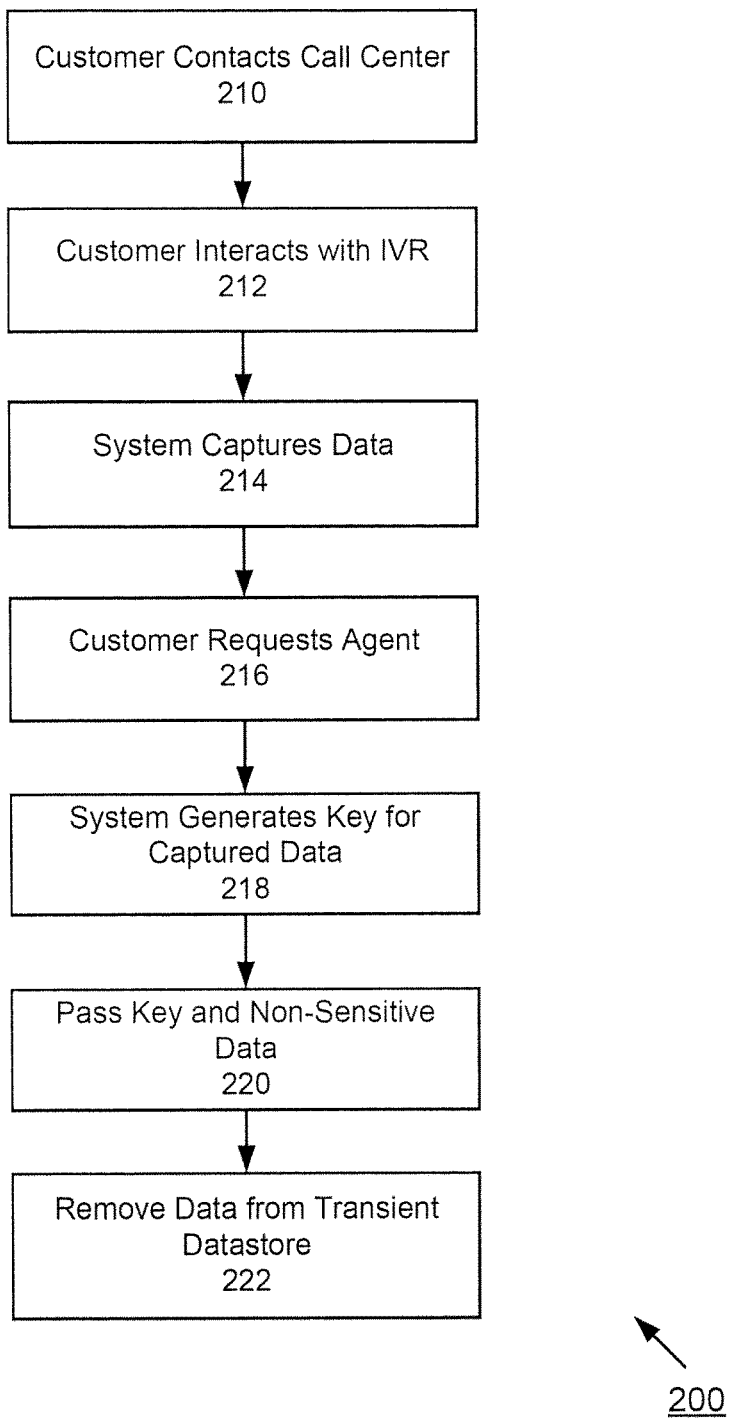
FIG. 2 is an exemplary diagram of a method for generating a key to transmit sensitive data in a contact center environment, according to an embodiment of the present invention.

FIG. 2 is an exemplary diagram of a method for generating a key to transmit sensitive data in a contact center environment, according to an embodiment of the present invention. At step 210, a customer may contact a contact center via a communication channel. At step 212, the customer may interact with the IVR. At step 214, the system may capture the interaction data. At step 216, during the user contact, the user may request a live agent. At step 218, the system may generate a key for the captured data. At step 220, the key may be passed to the agent. At step 222, the corresponding data may be removed after a predetermined time period. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a customer may contact a contact center via a communication channel. The customer's contact may involve an initial interaction with an IVR or other automated entity. The user contact may involve voice commands, touch-tone commands, biometrics, and/or other forms of interaction.

At step 212, the customer may interact with the IVR. During the interaction, customer data may be received, such as customer identity, customer identifier, account number, etc. Authentication and/or other verification data may be accessed as well. The customer may provide authentication data to verify the customer's identity and authorization, including credit card number, account number, name, password, username, etc. The customer may also provide inputs, including touch tone commands, voice commands, etc., in response to automated prompts. For example, customer inputs can explain why the customer is contacting the organization or entity.

An embodiment of the present invention is directed to a method and system for implementing a transient datastore that generates a key that corresponds to interaction data for a particular customer for a particular interaction. According to an embodiment of the present invention, customer interaction data may be stored in a big data implementation, including distributed storage and distributed processing of very large data sets. When the customer starts interaction with an entity, such as a bank, financial institution, merchant, service provider, information service, intermediary, etc., an embodiment of the present invention may authenticate the customer and gather any interaction data. This initial interaction may include interaction with an automated service, such as an IVR. For example, the transient datastore may store customer profile data as well as analytics data that may include data relating to the customer's last interaction, the problem resolved and whether there were any changes to the customer's account.

At step 214, the system may capture the interaction data. The information gathered during the initial interaction with the IVR or other automated entity may be captured, stored and/or analyzed. Information may include current interaction data, such as customer requests, series of touch tones and underlying issues, voice commands, etc. During the interaction, customer data may be received, such as customer identity, customer identifier, account number, etc.

Other information may be retrieved during the interaction, such as account status, geographic location, data relating to any patterns, etc. At step 216, during the user contact, the user may request a live agent. The user may also request a transfer to another system, division, unit, etc. Other requests may be captured.

At step 218, the host system may generate a key for the captured interaction data. Specifically, a transient datastore may generate a key that is specific for the customer and the current interaction with the customer.

The key may refer to various forms of data which may include customer identification data (e.g., name, address, demographics, financials, etc.), account data (e.g., balance, late fees, charges, etc.), prior interactions (e.g., last interaction, last request, summary of prior contacts, etc.), current interaction (e.g., issues identified via IVR interaction, questions, issues, etc.) and special instructions (e.g., flags, alerts, warnings, customer requests, customer preferences, etc.). The key may also include a reference to other data. The reference may in a format such as ASCII characters, other character-encoding schemes, an XML string, key to a datastore or other storage device, a link, a hyperlink, code, category, visual, link to data (including images, video, etc.).

The key itself may be encrypted or hashed with varying forms of information. The information may depend on key size and/or other factors. According to an exemplary application, the key may include a plurality of identifiers such as a Producer ID (e.g., fixed length); a Consuming Client/Component ID (e.g., fixed length; consuming client or component identifier may be one or more based on the number systems in the path); a Data Sequence ID (e.g., sequencing may be predetermined and configurable) and a Data Sensitivity (e.g., multiple levels may be configurable and/or customizable). Other variations and other information may be included depending on the application and/or environment.

At step 220, the key may be passed to the agent or other recipient or receiving unit. According to an exemplary system, the key from the transient datastore may have to traverse multiple devices, systems, components along the chain. This information may be used for proper routing to an agent, other end user or destination. The key along with non-sensitive data may be sent to the agent. Non-sensitive data may refer to data that may be useful for the agent in corresponding with the customer, for example.

According to an exemplary embodiment, when the customer is forwarded to the live agent, the live agent will have access to the key and other non-sensitive data. Using the key, the live agent may request additional information from the transient datastore. Also, based on the receiving device, an embodiment of the present invention may provide information, without an affirmative request, that might be useful or helpful.

At step 222, the generated key may expire after a predetermined period of time or other threshold event. This prevents from the data being accessed again. The corresponding data in the datastore may be managed at another permanent storage for further analysis and reporting. Also, selective data may be stored for other uses, including analytics, reporting, feedback, marketing, data mining, etc.

The embodiments of the present invention may be applied to various environments and applications, such as the utilities industry (e.g., electric, gas, phone, etc.), finance industry (e.g., card, loan, etc.), services industry (e.g., airline, hotel, rental, etc.), to protect customer sensitive information such as account number, name, balance, etc.

Figure 3:
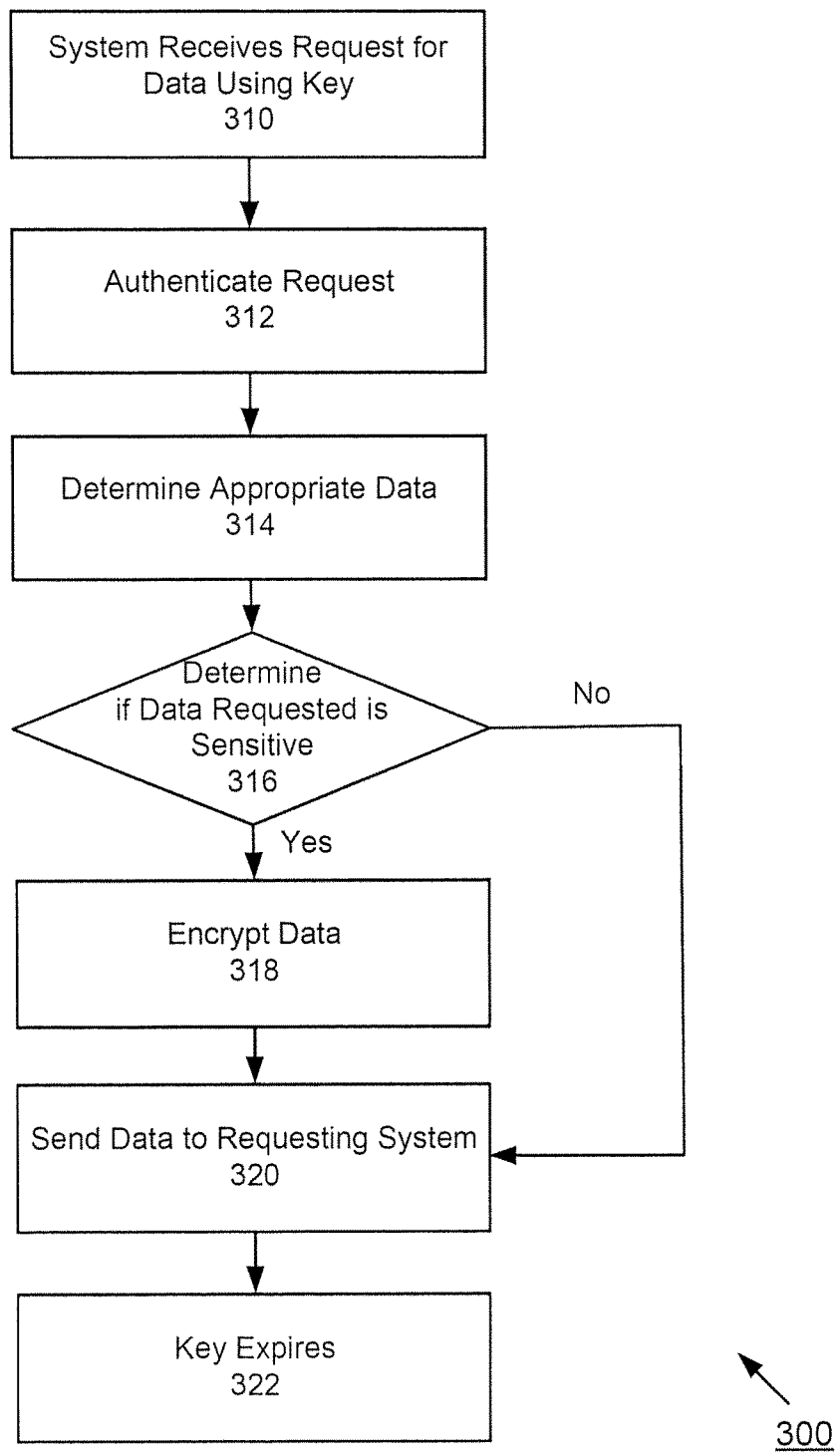
FIG. 3 is an exemplary diagram of a method for transmitting a key for sensitive data in a contact center environment, according to an embodiment of the present invention.

FIG. 3 is an exemplary diagram of a method for transmitting a key for sensitive data in a contact center environment, according to an embodiment of the present invention. At step 310, a host system may receive a request for data using a key. At step 312, the host system may authenticate the request using the key and a requester identifier. At step 314, the host system may determine appropriate data based on the requester identifier. At step 316, a determination may be made as to whether the data requested is sensitive. At step 318, if the data is sensitive, an appropriate encryption may be applied. If not, the data may be sent unencrypted at step 320. At step 322, the key and access to the data may expire after a predetermined time. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, a host system may receive a request for data using a key. The host system may include a transient database that receives the key with a request for data. For example, the agent may request additional information, such as account information, financial data, etc. With this request, the agent device may send the corresponding key generated for the current interaction. Another intermediate device may request additional data and, in the same manner, the intermediate device may send a request along with the corresponding key for the current interaction with the customer.

The elements of the key may be configurable and adjusted on the fly. According to an exemplary embodiment, a client or component requesting data may send the generated key back to a transient data system. In addition to the key, the client or component may also send a request including an application name, client identifier and Domain Name System (DNS) name and/or IP address/port. An embodiment of the present invention may then authenticate/validate the key and a corresponding entitlement for the particular client or component. Upon successful authentication validation, the transient datastore may send the pre-determined data set to the requesting client or component. The response message may then be sent back with an appropriate encryption corresponding to the data sensitivity.

An embodiment of the present invention may determine or identify what the requesting client or component needs. The determination may include determining what data is needed by the client/component, why the client/component needs the data, whether the client/component will modify the data and how the system of record will be updated. The determination for each requester may be based on the basic principle of least privileges (PLP). For example, PLP may provide minimal user/application privileges based on the necessity to perform the assigned function. Accordingly, an embodiment of the present invention provides the specific data elements required for the client/component to do perform its task or function.

At step 312, the host system may authenticate the request using the key and an identifier corresponding to the requesting device. More specifically, the transient datastore of the host system may authenticate the request by using the key confirming that the key is current and the same key generated for the instant interaction with the customer.

At step 314, the host system may determine appropriate data. The host system may also identify the requesting device. Based on the identity (or type) of the requesting device, a predetermined set of data may be identified. For example, a routing device may need to know the subject matter of the customer's inquiry to direct the contact to an appropriate representative or recipient. Other relevant data may include the customer's initial interaction with the IVR or other automated entity, such as current interaction data, customer requests, series of touch tones and underlying issues, voice commands, etc. Other information may be retrieved from the transient database including account status, geographic location, data relating to any patterns, etc. Other data may include customer identification data (e.g., name, address, demographics, financials, etc.), account data (e.g., balance, late fees, charges, etc.), prior interactions (e.g., last interaction, last request, summary of prior contacts, etc.), current interaction (e.g., issues identified via IVR interaction, questions, issues, etc.) and special instructions (e.g., flags, alerts, warnings, customer requests, customer preferences, etc.).

At step 316, a determination may be made as to whether the data requested is sensitive. Sensitive may be categorized or otherwise identified as being sensitive or confidential. Such data may include a customer's account numbers, financial history, passwords, customer identification information, etc. Sensitive data may be identified by a flag, category, filter, and/or other indicator. Varying degrees of sensitivity may be identified.

At step 318, if the data is sensitive, an appropriate encryption may be applied. An embodiment of the present invention may recognize sensitive data and apply an encryption prior to transmitting the data to the requesting component. Depending on the level or degree of sensitive, an embodiment of the present invention may apply a corresponding encryption algorithm. Other forms of security may be applied.

If the data is not deemed sensitive, the data may be sent unencrypted, at step 320.

At step 322, the key may expire after a predetermined time. For example, after a predetermined period of time, the key may expire thereby preventing access to any sensitive data. The key may expire after a predetermined time (e.g., 4 hours after the interaction, etc.), a predetermined event (e.g., at the end of the day, etc.), etc.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account info' nation, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division. Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming Language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system for transmitting sensitive data in a contact center environment, wherein the system comprising:
   a transient datastore containing data, for each customer, defining a customer's profile including historical interactions with a host entity and account information, the customer profile containing sensitive and non-sensitive data;

a computer processor, coupled to the computer store and programmed to:
receive from a remote customer, an electronic request to interact with for an agent during a current contact;
generate, using a computer processor, an electronic transient key associated with a subset of data for the remote customer;
transmit, using a computer processor, the electronic transient key and non-sensitive data to the agent in the contact center environment;
receive a request comprising the electronic transient key and a requester identifier from a requesting component of the system,
identify a corresponding subset of data responsive to the electronic transient key and the requester identifier;
determine whether the corresponding subset of data comprises sensitive data;
transmit the corresponding subset of data to the requesting component; and
automatically remove the electronic transient key from the transient datastore.

2. The system of claim 1, wherein the electronic transient key comprises a token that expires after a predetermined period of time.

3. The system of claim 1, wherein a security feature is applied to the corresponding subset of data, the security feature comprises an encryption algorithm.

4. The system of claim 1, wherein the electronic transient key is removed from the transient database after a predetermined time period.

5. The system of claim 1, wherein the current content comprises interaction with an interactive voice response unit.

6. The system of claim 1, wherein the electronic transient key is encrypted or hashed.

7. The system of claim 1, wherein the electronic transient key comprises a producer identifier, a consumer client identifier, a data sequence identifier and data sensitivity identifier.

8. The system of claim 1, wherein the electronic transient key is further associated with an application name, client identifier, and DNS name.

9. The system of claim 1, wherein the requesting component comprises an intermediate processing system.

10. The system of claim 1, wherein the corresponding subset of data is predetermined based on the requester identifier.

11. An automated computer implemented method for transmitting sensitive data in a contact center environment, wherein the method comprising the steps of:

receiving, via an electronic input, from a remote customer, an electronic request to interact with for an agent during a current contact;
generating, using a computer processor, an electronic transient key associated with a subset of data for the remote customer;
transmitting, using a computer processor, the electronic transient key and non-sensitive data to the agent in the contact center environment;
receiving a request comprising the electronic transient key and a requester identifier from a requesting component of the system,
identifying a corresponding subset of data responsive to the electronic transient key and the requester identifier;
determining whether the corresponding subset of data comprises sensitive data;
transmitting the corresponding subset of data to the requesting component; and
automatically removing the electronic transient key from the transient datastore; the transient datastore containing data, for each customer, defining a customer's profile including historical interactions with a host entity and account information, the customer profile containing sensitive and non-sensitive data.

12. The method of claim 11, wherein the electronic transient key comprises a token that expires after a predetermined period of time.

13. The method of claim 11, wherein a security feature is applied to the corresponding subset of data, the security feature comprises an encryption algorithm.

14. The method of claim 11, wherein the electronic transient key is removed from the transient database after a predetermined time period.

15. The method of claim 11, wherein the current content comprises interaction with an interactive voice response unit.

16. The method of claim 11, wherein the electronic transient key is encrypted or hashed.

17. The method of claim 1, wherein the electronic transient key comprises a producer identifier, a consumer client identifier, a data sequence identifier and data sensitivity identifier.

18. The method of claim 11, wherein the electronic transient key is further associated with an application name, client identifier, and DNS name.

19. The method of claim 11, wherein the requesting component comprises an intermediate processing system.

20. The method of claim 11, wherein the corresponding subset of data is predetermined based on the requester identifier.

* * * * *